UNITED STATES PATENT OFFICE.

PHILIP H. MANDEL, OF ASTORIA, NEW YORK.

PROCESS OF MAKING COPIES OF TRACINGS.

SPECIFICATION forming part of Letters Patent No. 294,485, dated March 4, 1884.

Application filed June 26, 1883. (No specimens.)

*To all whom it may concern:*

Be it known that I, PHILIP H. MANDEL, of Astoria, in Queens county, and the State of New York, have invented a certain new and useful Improvement in Processes of Making Copies of Tracings, &c., of which the following is a specification.

The object of the present improvement is to provide for copying tracings, drawings, and other illustrations which are made on transparent material.

In carrying out my improvement I take a pane of glass, which preferably will be about the size of the tracing or illustration to be copied, and preferably first cover it with very thin collodion. This may be done by pouring the collodion onto the pane of glass, flowing it over the glass by tilting the glass in various directions, and then allowing the surplus to drain off. When the pane of glass becomes dry, I apply over the collodion a material which, after drying, will absorb moisture and become slightly tacky or sticky, except where exposed to the action of the sun's rays, and which, at such portions as are acted upon by the sun's rays, will cease to have the same adaptability to absorb moisture. I have found that this material may be advantageously made by taking, say, about two grams of bichromate of ammonia, about seven grams of gum-arabic, and about three grams of sugar, preferably grape-sugar, and dissolving the same in about one hundred and fifty grams of water. The material thus made may be applied by pouring it on, then flowing it over by tilting the glass in various directions to cause the material to flow over all parts, and subsequently allowing the surplus to drain off. The pane of glass thus treated is then dried in any suitable manner—as, for instance, by setting it over a box or chamber heated internally in any suitable manner, or by placing it in an oven. This should be done in a room similar to a photographer's dark room. When the pane of glass is dry, it is placed in a frame, with the tracing or other illustration in contact with its side, which was treated as above described. The tracing or illustration may be laid in the frame first and the glass afterward. Care must in any case be taken to have the tracing or illustration smooth. The tracing or illustration is to be laid with the side on which the drawing or picture is delineated toward the treated side of the glass. When the pane of glass and tracing or illustration have been fastened in the frame, the whole are turned over, so that the back of the tracing or illustration will be exposed to the light. It is left exposed for about twenty seconds, if in the rays of the sun; but if in the shade, or if the weather is cloudy, a longer exposure will be necessary. Artificial light—such as the electric light or calcium light—may be used instead of sunlight. Wherever the light shines through these portions of the tracing or illustration which are between the lines the sensitive material will be changed, so that it will lose its tackiness or stickiness; but where the material is covered by the lines it remains tacky or sticky. After the proper exposure has been made, the pane of glass, with the tracing or illustration on it, is taken to a room which is like a photographer's dark room. The tracing or illustration is then removed from the pane of glass. Before removing the pane of glass from the dark room I dust lamp-black over its treated surface with a brush or otherwise.

I have found that I can use the lamp-black better for my purpose after treating it with milk. I therefore place a quantity of lamp-black in milk, mix the two together by shaking or stirring, and then pass the mixture through a fine filter, preferably having as a component part of it a linen or other cloth. The lamp-black which is caught by the filter I allow to dry and then use it. By its treatment with milk it acquires a sufficient greasiness to enable me to apply it with great uniformity.

I do not here claim the process described for treating lamp-black or coloring-matter, and I may make such process the subject of another application for Letters Patent.

The lamp-black so prepared, or otherwise, adheres to the tacky or sticky portions of the sensitive material which were covered by the lines of the tracing or illustration, and does not adhere to the other portions of the material which were affected by exposure to the light. I now apply to the sensitive material a thin collodion. This I may do by pouring the collodion over the material, tilting the pane of glass to cause the collodion to flow over all parts, and then allowing the surplus to drain off. After the collodion has dried, I preferably place the pane of glass in a bath of water containing about one to one and a half grains of nitric acid to each gallon of water. This will neutralize any bichromate of ammonia, which otherwise might produce a yellow hue. While the treated side of the pane of glass is still wet from the bath I pour or run over it a solution consisting of six grams of gelatine to every twelve hundred grams of water. A sheet of tracing-muslin or other material is now applied to the treated side of the pane of glass before it has become dry, and is rubbed or pressed down with any suitable device, so as to lie close to the treated side of the glass throughout its extent. It is then left to dry. It may dry in the open air. The tracing-cloth or other material is finally peeled or stripped off the glass, and carries with it the sensitive material which was applied to the glass, and which had the original tracing or illustration delineated on it with the lamp-black. That side of the cloth or other material on which adheres the sensitive material bearing the copy produced is generally to serve as the front or face, the sensitive material being transparent, so that the lines may be seen through it, although delineated on its side which is next to the cloth or material; hence the copy, when finished, will be a reproduction of the original, in contradistinction to a negative.

In lieu of using lamp-black, any other suitable powdered material may be used.

What I claim as my invention, and desire to secure by Letters Patent, is—

1. The process of copying a tracing, drawing, or other illustration delineated on transparent material, consisting in applying to a pane of glass a sensitive material composed of bichromate of ammonia, gum-arabic, sugar, and water, or the equivalent of such material, which when not exposed to the light is tacky or sticky, but which when exposed to the light loses its tackiness or stickiness; in laying the illustration over the said sensitive material; in exposing the illustration to the light; in subsequently removing the illustration; in applying lamp-black or analogous material outside the sensitive material; in subsequently applying a sheet of material on which the copy is to be made, and in finally stripping off the material on which the copy was to be made, and the said sensitive material with it, substantially as specified.

2. The process of copying a tracing, drawing, or other illustration delineated on transparent material, consisting in taking a pane of glass, in applying to one side thin collodion; in next applying over the collodion a sensitive material composed of bichromate of ammonia, gum-arabic, sugar, and water, or the equivalent of such material, which when not exposed to light is tacky or sticky, but which when exposed to light loses its tackiness or stickiness; in subsequently applying the illustration to be copied over the sensitive material; in subsequently exposing the illustration thus applied to the light; in subsequently removing the illustration; in then applying lamp-black or analogous material outside the sensitive material; in subsequently applying a thin collodion; in afterward applying a sheet of material on which the copy is to be made, and in finally stripping off this sheet of material, and the said sensitive material with it, substantially as specified.

PHILIP H. MANDEL.

Witnesses:
T. J. KEANE,
JAMES R. BOWEN.